US012507643B2

(12) United States Patent
Kobelt

(10) Patent No.: US 12,507,643 B2
(45) Date of Patent: Dec. 30, 2025

(54) GROW POT FOR AN AEROPONIC/HYDROPONIC SYSTEM, AEROPONIC SYSTEM AND ASSEMBLY

(71) Applicant: Sprout Systems AG, Windlach (CH)

(72) Inventor: Severin Kobelt, Windlach (CH)

(73) Assignee: Sprout Systems AG, Windlach (CH)

( * ) Notice: Subject to any disclaimer, the term of this patent is extended or adjusted under 35 U.S.C. 154(b) by 0 days.

(21) Appl. No.: 17/924,721

(22) PCT Filed: May 11, 2021

(86) PCT No.: PCT/EP2021/062474
§ 371 (c)(1),
(2) Date: Nov. 11, 2022

(87) PCT Pub. No.: WO2021/228850
PCT Pub. Date: Nov. 18, 2021

(65) Prior Publication Data
US 2023/0189730 A1 Jun. 22, 2023

(30) Foreign Application Priority Data
May 13, 2020 (EP) .................................... 20174415

(51) Int. Cl.
*A01G 31/02* (2006.01)

(52) U.S. Cl.
CPC .................................... *A01G 31/02* (2013.01)

(58) Field of Classification Search
CPC ...... A01G 31/02; A01G 31/04; A01G 31/045; A01G 31/042; A01G 31/00
See application file for complete search history.

(56) References Cited

U.S. PATENT DOCUMENTS 3,757,470 A * 9/1973 Shimamoto ............ A01G 31/02 47/62 R
4,324,069 A * 4/1982 Flagg .................. A01G 27/001 47/62 E (Continued)

FOREIGN PATENT DOCUMENTS

EP 0 142 989 A2 5/1985
EP 2 644 025 A1 10/2013

(Continued)

OTHER PUBLICATIONS

International Search Report for PCT/EP2021/062474 dated Jul. 27, 2021.
Written Opinion for PCT/EP2021/062474 dated Jul. 27, 2021.

*Primary Examiner* — Joshua D Huson
*Assistant Examiner* — Spencer T Callaway
(74) *Attorney, Agent, or Firm* — Sughrue Mion, PLLC

(57) ABSTRACT

An aeroponic system having a longitudinal hollow cylindrical grow tube with through-holes in the upper surface of the shell of the grow tube for accommodating grow pots with a hollow shell having an upper part and a lower part. The lower part has a plurality of cut-outs and the upper part has a flange to be supported on the edge of a through-hole of the grow tube and is a curved flange with a underside complementary to the curved upper surface of the cylindrical grow tube. The aeroponic system becomes a closed system by connecting a pressure manifold to the grow tube at its head portion and has an internal distribution pipe with nozzles configured to mist the nutrient solution into the grow chamber, avoiding as such additional through-holes in the grow tubes.

5 Claims, 15 Drawing Sheets

(56) References Cited

U.S. PATENT DOCUMENTS

| | | | | |
|---|---|---|---|---|
| 4,965,962 | A * | 10/1990 | Akagi .................. | A01G 31/045<br>47/62 A |
| 5,009,029 | A * | 4/1991 | Wittlin .................. | A01G 31/02<br>47/18 |
| 5,067,275 | A | 11/1991 | Constance | |
| 5,394,647 | A | 3/1995 | Blackford, Jr. | |
| 5,557,884 | A * | 9/1996 | Deppe .................... | A01G 31/02<br>47/62 E |
| 2014/0137471 | A1* | 5/2014 | Harwood ............... | A01G 31/02<br>47/62 A |
| 2015/0173314 | A1 | 6/2015 | Buonaiuto, Jr. et al. | |
| 2018/0338430 | A1 | 11/2018 | Cobzev et al. | |
| 2019/0261577 | A1* | 8/2019 | Burford ................. | A01G 31/02 |

FOREIGN PATENT DOCUMENTS

| | | | | |
|---|---|---|---|---|
| KR | 10-2016-0053399 | A | | 5/2016 |
| KR | 20160053399 | A | * | 5/2016 |
| WO | 2016/061672 | A1 | | 4/2016 |
| WO | 2019/176070 | A1 | | 9/2019 |

* cited by examiner

GROW POT FOR AN AEROPONIC/HYDROPONIC SYSTEM, AEROPONIC SYSTEM AND ASSEMBLY

CROSS REFERENCE TO RELATED APPLICATIONS

This application is a National Stage of International Application No. PCT/EP2021/062474 filed May 11, 2021, claiming priority based on European Patent Application No. 20174415.8 filed May 13, 2020.

TECHNICAL FIELD

The present invention relates to a grow pot of an aeroponic/hydroponic system as well an aeroponic system according to the preamble of the independent claims.

PRIOR ART

Aeroponics is the process of growing plants in an air or mist environment without the use of soil or an aggregate medium. The basic principle of aeroponic growing is to grow plants suspended in a closed or semi-closed environment by spraying the plant's dangling roots and lower stem with an atomized or sprayed, nutrient-rich water solution. The leaves and crown, i.e. the canopy, extend above. The roots of the plant are separated by the plant support structure.

US 2018/338430 A1 discloses a microponic irrigation system is formed using a plurality a grow tubes, a pressure manifold, and a drainage manifold. Each of the plurality of grow tubes defines a grow chamber within the interior of the grow tube and is provided with at least one cradle assembly to support of a plant disposed with its roots suspended in air within the grow chamber. The pressure manifold fluidly couples a reservoir to each of the plurality of grow tubes and delivers nutrient solution housed in the reservoir to the plurality of grow tubes under pressure. The pressurized nutrient solution delivered to the grow tubes is misted into each grow chamber to be absorbed into the roots of each rooted clone supported in the grow tube. The drainage manifold collects unabsorbed nutrient solution from each of the plurality of grow tubes and circulates the unabsorbed nutrient solution back to the reservoir.

WO 2016/061672 A1 discloses systems, apparatuses and methods for growing marijuana plants with automated subsystems with sensors to provide feedback information about system, apparatus and plant growth parameters to one or more controllers so that the one or more controllers can alter one or more parameters to provide optimal conditions for the growing and harvesting of the marijuana plants. The system comprises grow tubes wherein each grow tube defines a grow chamber within its interior.

KR 2016/0053399 A1 discloses an orchid cultivation device, comprising: a plurality of pots where plants are planted and having a main body with an opening unit; a growing stand having through-holes, which are spaced with a predetermined distance to each other in a longitudinal side thereof to allow the pots to be mounted respectively on the through-holes; a culture fluid supply unit connected to the growing stand and spraying culture fluid toward the pots; and a control unit controlling the culture fluid supply unit.

EP 0 142 989 A2 discloses a modular plant propagation system and apparatus utilizing a first or lower hermetically sealed reservoir containing a liquid plant nutrient in fluid communication with a second or upper partially hermetically sealed reservoir in which a plant propagation support module utilizes a sterile, low water retention, linear foam plastic providing fluid communication between the exterior and interior of the second or upper reservoir. The nutrient fluid in the first nutrient reservoir is forced up into the second reservoir by compressed gas for predetermined cycles and periods of time to provide nutrients to the roots of the plants supported by the linear foam plant propagation support module.

US 2015/173314 A1 discloses a hydroponic pot for supporting vegetation therein having a neck forming an opening. A cage extends from the neck. A lip extends from the neck, and is curved along the neck.

U.S. Pat. No. 5,394,647 discloses a hydroponic plant growing system having a horizontal tubular chamber capped at each end, the chamber having a series of holes along its top for supporting a plurality of flower pots or cups having holes in their bottoms to enable root growth outside of the pot or cup to access the plant nutrients. The pots or cups can contain similar and/or different vegetables and other plants. A horizontal divider containing a series of small drip holes extends from end to end within the center of the tubular chamber. A water pump circulates water and other nutrients from a reservoir system through a spray means inside the tubular chamber based on a timer set.

U.S. Pat. No. 5,067,275 discloses a hydroponic garden utilizing conventional flower pots for growing chambers and a plastic PVC pipe supporting the flower pots through openings in the upper wall of the pipe so that a nutrient solution circulating through the plastic pipe feeds the plants growing in the flower pots. A timer controlled pump circulates the nutrient solution from a reservoir through the conduit and back to the reservoir according to a predetermined program. The hydroponic garden is supported on a table so that the plants are at a convenient height to work on without the need to bend or kneel. Table includes a trellis to support the plants. The table is equipped with wheels that enable the table and hydroponic garden to be moved if necessary.

SUMMARY OF THE INVENTION

Based on this prior art it is an object of the present invention to provide an improved grow pot handling.

This object is achieved for a grow pot with the features of claim 1. Such a grow pot is intended to be used in aeroponic as well as hydroponic systems and comprise a longitudinal hollow cylindrical grow tube with through-holes in the upper surface of the shell of the grow tube, wherein the grow pot comprises a hollow shell having an upper part and a lower part wherein the lower part comprises a plurality of cut-outs and the upper part has a flange to be supported on the edge of a through-hole of the grow tube, wherein the flange is a curved flange with a underside complementary to the curved upper surface of the cylindrical grow tube.

Here, the feature "cylindrical" is to be understood in a mathematical sense, i.e. a grow tube with a cross-section of a polygon, e.g. a hexagon or octagon, is also cylindrical tube. It is also possible to have half of a hexagon at the upper side and a rounded or V-shaped lower part, where the drainage is gathered. In the same way the curved flange is to be understand to follow in a complimentary way the surface of the grow tube.

The underside of the curved flange then has in cross-section a part-cylindrical, part-elliptic, part-hexagonal or part-octagonal shape. The shape to be chosen by the user is associated to the upper part of the cross-section shape of the grow tube, where the flange is positioned.

The cut-outs can be separated by vertical webs and/or horizontal circumferential webs. The bottom can be completely open or be slotted, especially comprise a star shaped web structure with cut-outs in-between. The upper part of the cut-outs can directly start below the flange's underside, allowing the distribution of a nutrient mist just until the passage of the grow pot through the grow tube.

In case that traditional grow pots with a horizontal flange is to be used in connection with rounded growth tubes, then an adapter can be used. Such a grow pot adapter is intended to be used in aeroponic as well as hydroponic systems. The definition of the form of the underside applies here as well.

The above mentioned object is achieved for an aeroponic system with the features of claim 5. The advantage of a closed system can be improved by connecting the pressure manifold to the grow tube at its head portion and the aeroponic system comprises then an internal distribution pipe with nozzles configured to mist the nutrient solution into the grow chamber, avoiding as such additional through holes in the grow tubes.

Furthermore, the internal distribution pipe can comprise distribution outlets having each at least one nozzle being oriented towards an adjacent grow pot for a main distribution of the nutrient solution mist in a conical shape towards said adjacent grow pot.

The above mentioned object is achieved with an aeroponic assembly comprising a plurality of frames having wheels or sliders, wherein one or more grow tubes are mounted on each of the plurality of frames, wherein all grow tubes of the assembly are positioned in parallel one to another in the longitudinal direction of the grow tubes, wherein the grow tubes comprise openings and the grow tubes is/are connected at one end with a transverse connecting pipe which is attached to a pressure manifold that fluidly couples a reservoir to the grow tubes, the pressure manifold delivering nutrient solution housed in the reservoir to the grow tubes under pressure, wherein the pressurized nutrient solution is misted into the grow chambers to be absorbed into the roots of each rooted plant supported in the grow tubes; and a drainage manifold that collects unabsorbed nutrient solution from the grow tubes, and optionally circulates the unabsorbed nutrient solution back to the reservoir; wherein a plurality of grow pots is to be introduced into the openings to support a plant disposed with its roots suspended in air within the grow tube, wherein the frames are positioned to be advanced in a traverse direction to the longitudinal direction of the grow tubes.

When the pressurized nutrient solution is misted into the grow chambers to be absorbed into the roots of each rooted plant supported in the grow tubes, this implies that a nozzle distribution element is built within the grow tube. It is an advantage of the system that the lines can be positioned mainly within the grow tube, i.e. as the return fluid is evacuated from within the head of the grow from every place from within the grow tube, the nutrient solution ducts can also be positioned essentially in the grow tube, from a connector at the head of the grow tube to the end of the grow tube with intermittent nozzles to distribute the nutrient solution.

A frame can also comprise several levels or shelves within a rack. In other words, several frames can be superposed with the legs of the frames one above the other. Of course, for stability reasons it is preferred that one single multi-level frame comprises a plurality of shelves one above the other. It is then also possible, that lamps are attached at the underside of the higher shelves above the plants in the grow tubes. Then the racks are pushed at the frames.

In a preferred embodiment, the aeroponic assembly further comprises a conveyor basis on which the frames of the aeroponic systems are standing and are advanced in said traverse direction through pusher dogs. A conveyor basis is preferably meant to comprise some guiding elements so that the frames are pushed in one single transverse direction. It is not necessary that the frames are pushed mechanically by pusher dogs. It is also possible to push the most exterior frame in a transverse direction to insert a new frame at the beginning of the system.

It is an advantage that this assembly can be connected to the nutrient delivering reservoir in a very easy way through providing as drainage manifold of each aeroponic system one single drainage duct and as pressure manifold at each aeroponic system one single nutrient solution manifold with two opposite free connectors. Then the aeroponic assembly only needs one, preferredly inclined, gutter with sidewalls between which the plurality of drainage ducts of the aeroponic systems are positioned, and at one or at each opposite end of the group of aeroponic systems one central pressure manifold. This one or these opposite two manifolds is/are connected to one of the opposite free connectors of the nutrient solution manifold of the exterior aeroponic system (s). And then all other "interior" aeroponic systems are interconnected with their opposite free connectors of the nutrient solution manifold to adjacent free connectors of neighboring aeroponic systems via a flexible compression proof distribution connection pipe.

Within the drawings the gutter and the pressure manifold providing the nutrient solution are provided at the "head" of the grow tube assembly, where the T-shaped connection tube is connecting to the several grow tubes. In the case of very long grow tubes, it is possible to mirror the "head" of the grow tube assembly, in other words, T-shaped connection tubes are provided and both opposite longitudinal ends of each grow tube and then it is possible to have pressure manifolds providing the nutrient solution at both opposite longitudinal ends of the frames, in case of multi-storey racks at more than one level one above the other. It is possible to have still only one gutter on one side, especially when the grow tubes are slightly inclined towards the single gutter side. But it is also possible to have a slightly bent or architectural pediment like grow tube with a higher portion in the middle and then providing a gutter at both sides in a parallel to said conveyor basis or sliding guides.

In this sense, connected to the drainage or nutrient distribution manifold means that there is a functional connection. In case of the drainage gutter, the evacuating hose or pipe is positioned above the drainage gutter for evacuation. According to a further embodiment, the nutrient distribution manifold is a gutter filled continuously or intermittently with nutrient solution. A pipe is extending from above into the gutter and is connected to a pump being part of the aeroponic assembly which then pumps the nutrient solution in predetermined intervals or monitoring if nutrient solution is present in the gutter via the distribution pipes into the growing chambers inside the tubes. Then there is no hose connection relating to fluids. In order to connect the pump with electrical power, a (rechargeable) battery can be provided on each assembly. It is preferred to connect the assembly with electrical lines to an external conductor rail arranged for the aeroponic system along one longitudinal end in parallel to one of the gutters. This supply can also be used to provide electrical power for lighting sources which are positioned above the growing tubes and especially in a multi-level rack, when each level has to have its own lighting installation beside the uppermost level which may have an externally fixed lighting.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
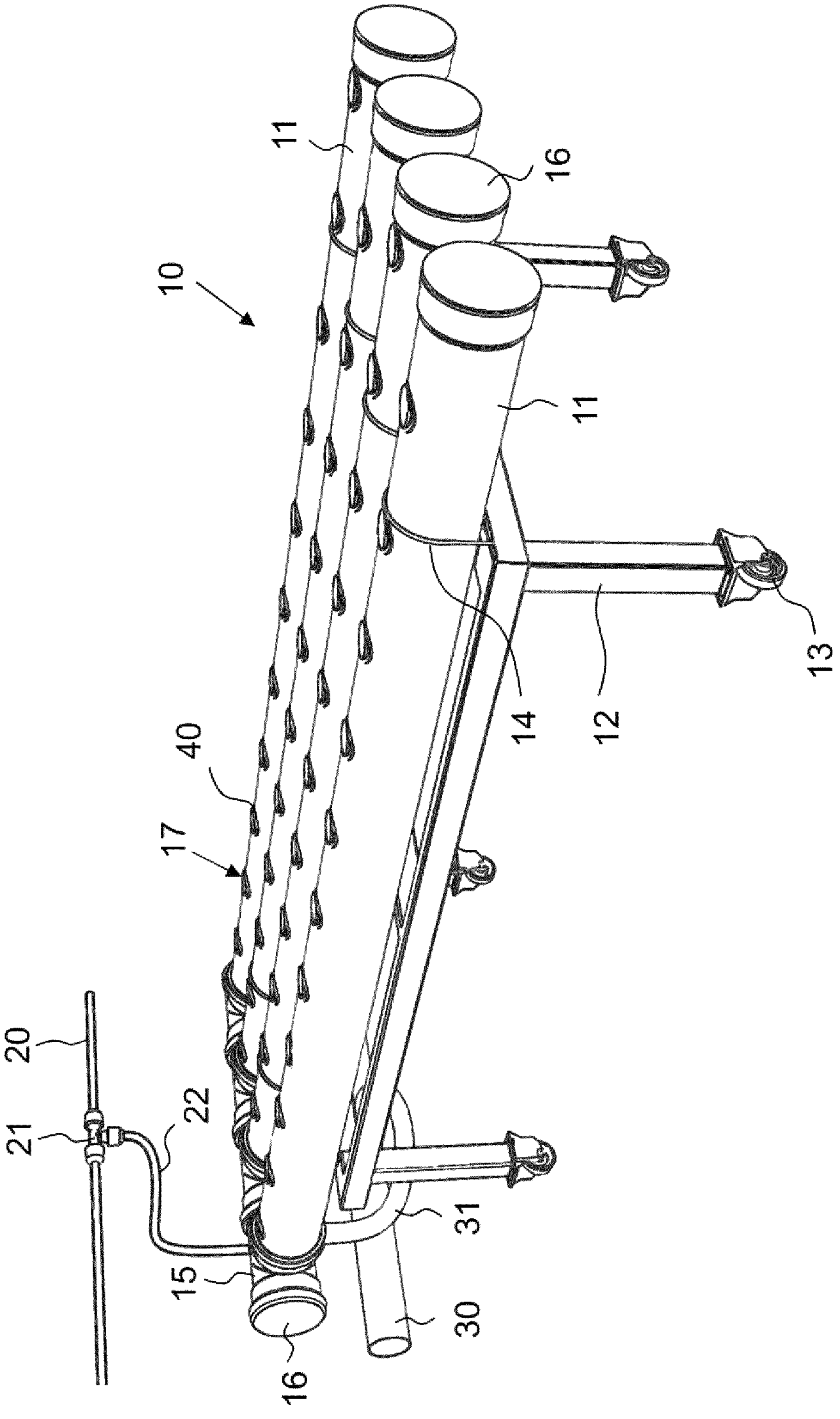
FIG. 1 shows a perspective view of a grow tube assembly with grow tubes according to an embodiment of the invention.

The invention is based around the way the grow pots 40 are positioned in a grow tube 11 which is part of a grow pot assembly 10 as shown in FIG. 1, which shows a perspective view of such a grow tube assembly 10 with grow tubes 11 and introduced grow pots 40 according to an embodiment of the invention.

One grow pot assembly 10 comprises a plurality of grow tubes 11. Here, four hollow cylindrical grow tubes 11 are closed at one free end with a cover 16. On the opposite free end a connection pipe 15 is attached. Every connection pipe 15 is a T-shaped element. Therefore, four connection pipes 15 are connected one with another and closed at the remaining ends with a cover 16. It is also possible to provide one combined connection pipe with four side openings to attach the four cylindrical grow tubes 11. However, independent parts 15 have the advantage that the number of grow tubes 11 is flexible and can be different, either e.g. only two or six or more.

The here four grow tubes 11 are positioned on a supporting frame 12, preferably provided with here four wheels at the four legs of the frame 12 to be able to move the frame 12 with the grow tube assembly 10. At the free end of the grow tubes 11 U-shaped fasteners 14 attach each grow tube 11 individually at the frame 12. On the connection pipe 15 end several grow tubes 11 are also attached to the frame 12.

A nutrient solution manifold 20 and a drainage manifold 30 are provided one parallel to the other. The nutrient solution manifold 20 is usually under pressure and positioned above the level of the grow tubes 11, but since it is pressurized it can also be positioned below these. The drainage manifold 30 is usually a duct of larger diameter and positioned below the grow tubes 11. The nutrient solution manifold 20 has T-junctions 21 for each grow tube assembly 10 which is connected to the T-junction 21 via a distribution pipe 22 which enters the connection pipe 15 as will be explained later. Said connection pipe 15 has an opening at its lower surface connected with a drainage pipe 31 which is then connected to the drainage manifold 30.

Each grow tube 11 has a length for here eleven through-holes 17 for the grow pots 40. This number depends on the length of the grow tube 11. This length can be far longer, e.g. until 100 meters.

It is noted that two or more frames 12 can be positioned one on the other, wherein the upper frames of course do not have wheels 13 but are connected to the lower frame 12. It is also possible to provide a multi-storey frame with several assemblies 10 to be positioned one on the other.

On the other side, it is possible with very long grow tubes 11 to provide connection pipes 15 at both opposite longitudinal ends of the grow tubes 11, i.e. replacing the covers 16, here the four covers on the right hand side. Then the manifolds 20 and 30 can also be doubled and provided as a second element and connected to the right hand side of the grow tubes 11 as shown on the left hand side in FIG. 1.

Figure 2:
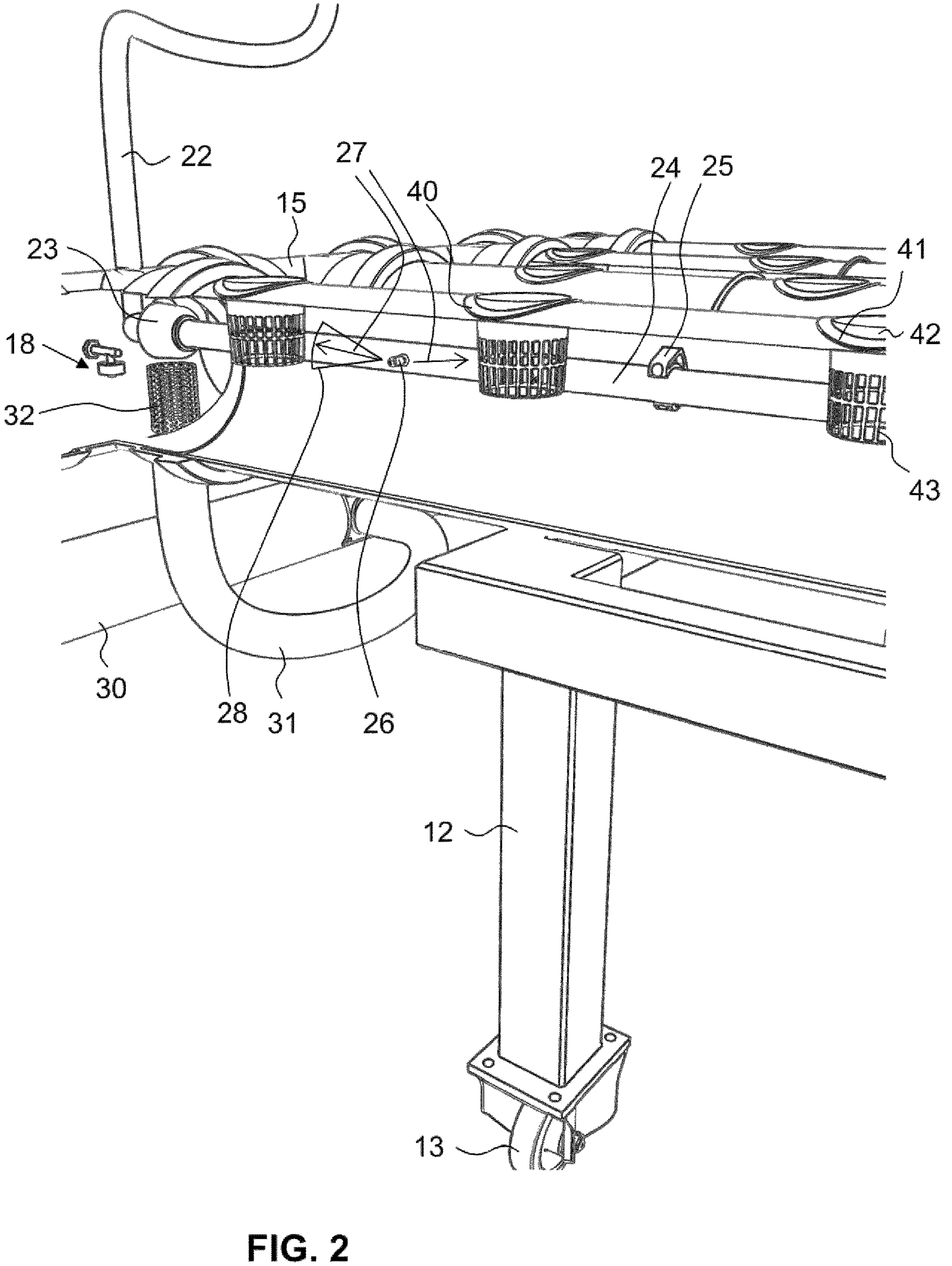
FIG. 2 shows a perspective partially sectional view of FIG. 1.

FIG. 2 shows a perspective partially sectional view of FIG. 1. A filter 32 is provided at the end of the drainage pipe 31 and enters into the opening of the connection pipe 15 which then empties the bottom of the connection pipe 15 into the drainage manifold 30. Preferably, a swimmer 18 is provided within the connection pipe to check and monitor the level of fluids to be drained and to detect any problems relating to the draining.

The distribution pipe 22 enters into the connection pipe 15 and is connected to a grow tube internal distributed pipe 24 for each grow tube 11 via distribution connector 23. The internal distributed pipe 24 is attached via braces 25 at the inside of the grow tube 11. It has a plurality of distribution outlet 26, preferably one each for a pot 40 when the outlet 26 is connected to a one-sided nozzle directed to said pot 40 or one each for two pots 40 when the outlet 26 is connected to a two-sided nozzle directed to said pots 40. The internal distributed pipe 24 is positioned near one side wall of the grow tube 11, here in the upper portion of the grow tube 11 at the same height as the lower part of said pots 40. However, since the nutrient can be sprayed via the nozzles via the pressurized ducts, the internal distributed pipe 24 can also be positioned higher or below the pots 40. There are two nozzles at every outlet 26 directed in the longitudinal direction of the grow tube 11, so that the two neighboring grow pots 40 are sprayed onto from in between. The two nozzles can also be provided in a V shape to spray diagonally. In another embodiment, there can be only one nozzle being directed essentially in the longitudinal direction of the grow tube 11 or a nozzle directed centrally in the grow tube 11, i.e. towards the opposite wall and relying on the wide angle distribution of the nozzle and convection for the mist to reach the grow pots.

The central directions 27 of orientation of the here two opposite nozzles are shown with an arrow near outlet 26. The arrows 27 are oriented towards the two adjacent grow pots for a main distribution of the nutrient solution mist towards said adjacent grow pot. Reference numeral 28 indicates and symbolizes with an arc the conical shape of the distribution of mist towards the adjacent grow pot.

It can already be seen in FIG. 2 that each grow tube 11 has at the upper surface a plurality of essentially round through-holes 17 in the wall of the grow tube 11 allowing to introduce a grow pot 40 into each of these through-holes 17. Each grow pot 40 has a curved flange 41 positioned outside on the grow tube 11, an outside portion 42 and a lower portion having cut-outs 43.

It is noted that the distributed pipe 24 in the embodiment of FIG. 2 are internal distributed pipes 24 with intermittent nozzles. This allows a single connector leading inside the grow tube 11 at the head of the grow tube. It is also possible to attach the distributed pipes 24 outside the grow tube 11 but this is less preferred, since additional holes are to be provided in the grow tube 11 to reach the intended placement of the nozzles 26.

Figure 3:
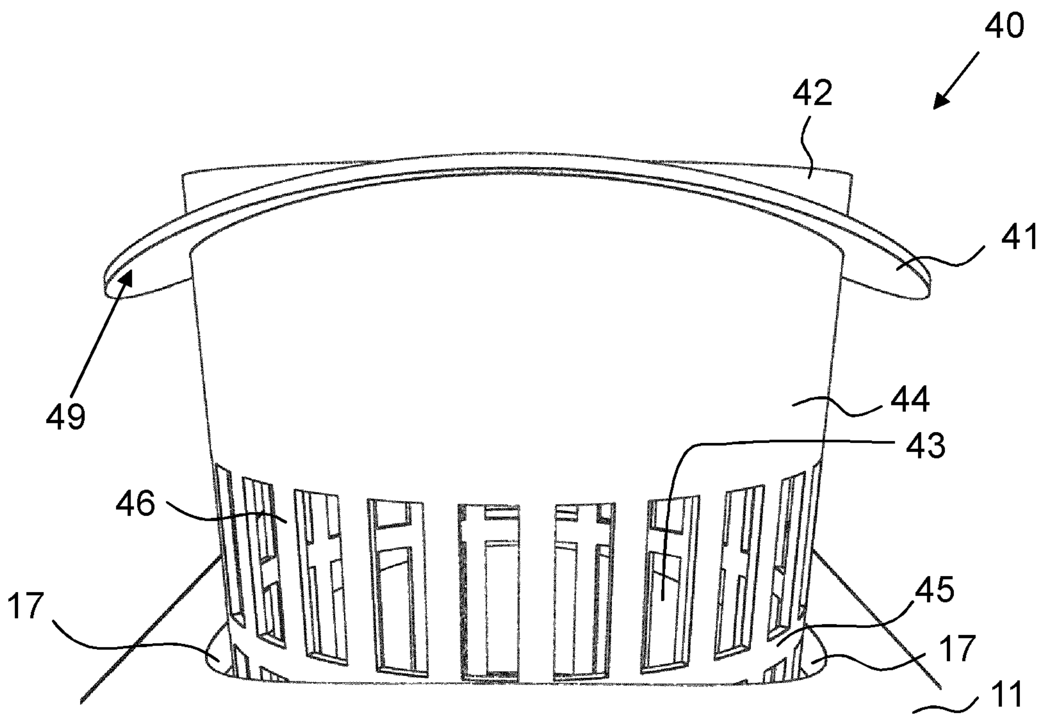
FIG. 3 shows a side view of a grow pot according to an embodiment of the invention, partly introduced into a grow tube.

FIG. 3 shows a side view of a grow pot according to an embodiment of the invention, partly introduced into a grow tube 11. The through-hole 17 is round for a round pot 40. It is also possible to cut out a square or rectangular through-hole 17 for other pots 40 with a square or rectangular section. In all solutions the flange 41 is at least partly curved. In the embodiment of FIG. 3 the underside 49 of the flange is positioned on the surface of the grow tube 11 with a curvature complimentary to the cylindrical grow tube 11. The pot 40 is extending in an outside portion 42 wherein the height of the outside portion 42 going beyond the curved flange 41 is chosen to have a horizontal upper edge. The outside portion 42 can also be waived, so that the grow pot 40 ends with the flange 41 as upper surface.

The pot 40 has a closed cylindrical closed part 44 below the cylindrical grow tube 11 followed by a cut-out portion with cut-outs 43. This portion comprises vertical webs 46 accompanying rectangular cut-outs 43 separated by horizontal webs 45. The closed cylindrical closed part 44 can be omitted; it enhances stability and is usually an area where no nutrient mist is to be distributed and just stabilizes the plant.

Figure 4:
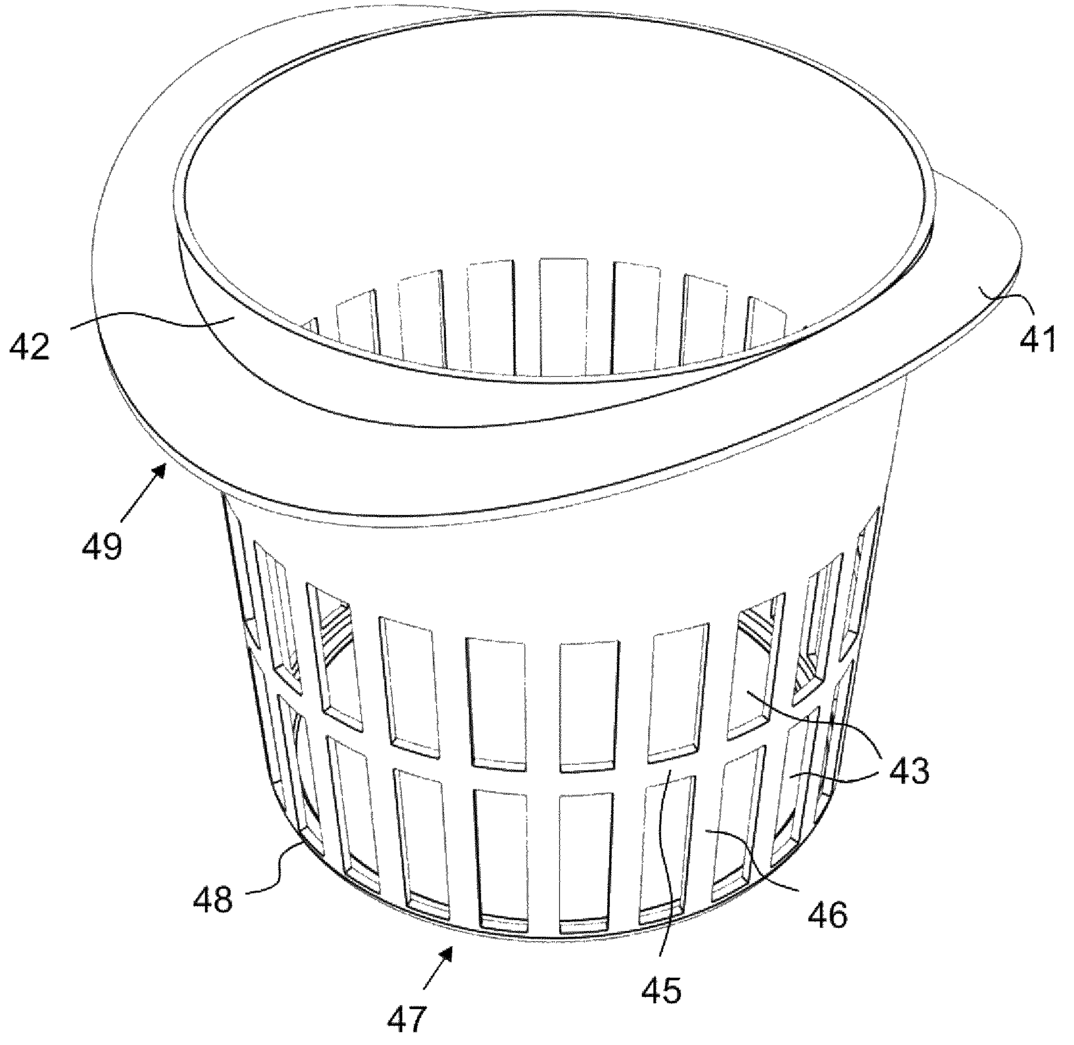
FIG. 4 shows a perspective view of a grow pot according to FIG. 3.

FIG. 4 shows a perspective view of a grow pot 40 according to FIG. 3. The pot 40 has two rows of cut-outs 43 one above the other separated by horizontal webs 45 and a lower edge 48 surrounds the open bottom 47. Within use the pot 40 is filled with a plant. The horizontal web 45 also enhances stability but can be omitted as well so that in the depth single cut-outs are arranged on the circumference. It is also possible to omit the circumferential lower edge 48 so that the vertical webs 46 end in free ends.

Figure 5A:
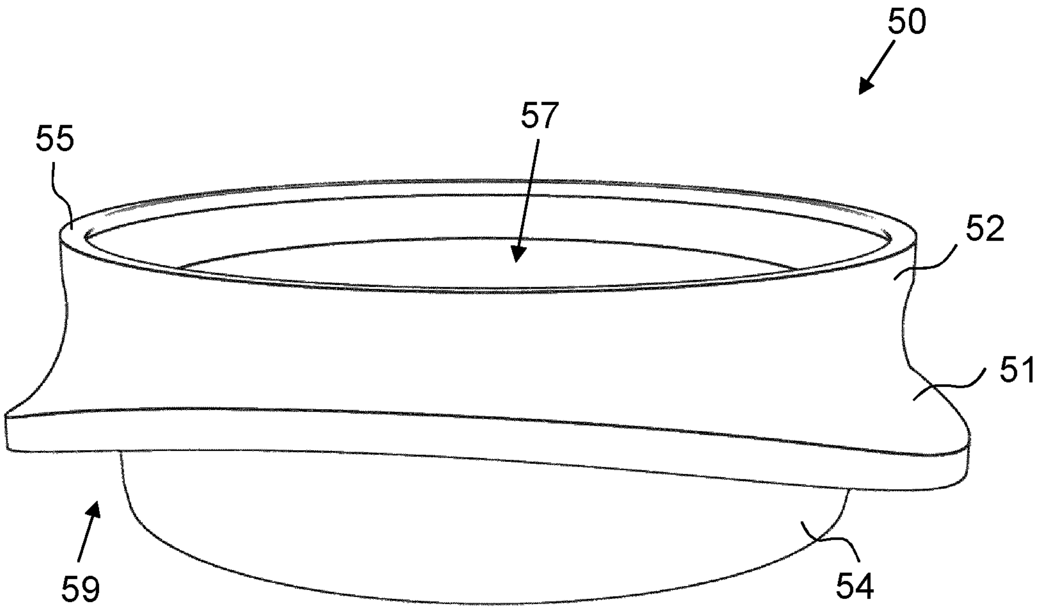
FIG. 5A shows a perspective view of an adapter for a conventional grow pot.

FIG. 5A shows a perspective view of an adapter 50 according to an embodiment of the invention. The adapter 50 for an aeroponic or hydroponic grow pot comprises a curved flange 51 with an underside 59 of the flange similar to the underside 49 of the curved flange 41. The curved flange 51 of the adapter 50 is connected with the outside portion 52 which comprises a horizontal upper supporting edge 55. The horizontal upper supporting edge 55 can provide a supporting surface for a traditional pot with a horizontal flange which can be introduced into the open through-hole 57 and through the through-hole 17, when the adapted is positioned on this through-hole 17 of the grow tube 11.

Figure 5B:
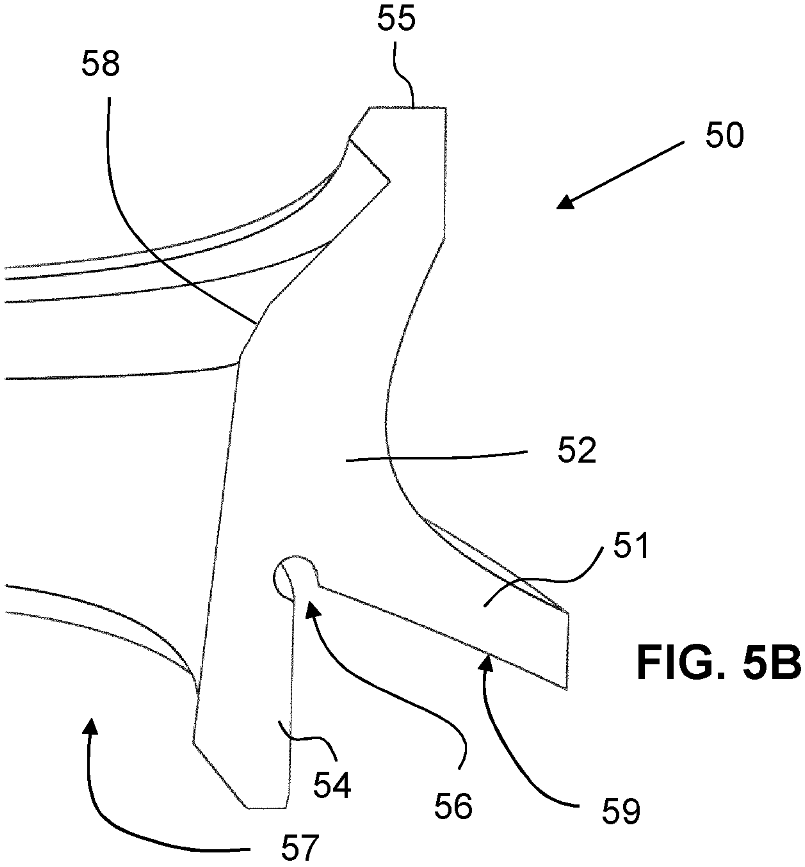
FIG. 5B shows a detail view in a cross-section of the adapter of FIG. 5A.

FIG. 5B shows a detail view in a cross-section of the adapter of FIG. 5A. A circumferential recess 56 is cut between the cylindrical part 54 and the flange 51 to allow some flexibility when the adapter 50 is inserted into the through-opening 17. The innerside of the cylindrical part 54 can be cylindrical as well but also conical to ensure a clear seating for an equally conical but traditional grow pot (without flange) to be inserted in the open through-hole 57 where the upper circumferential portion will be supported by the support surface 58.

Figure 6:
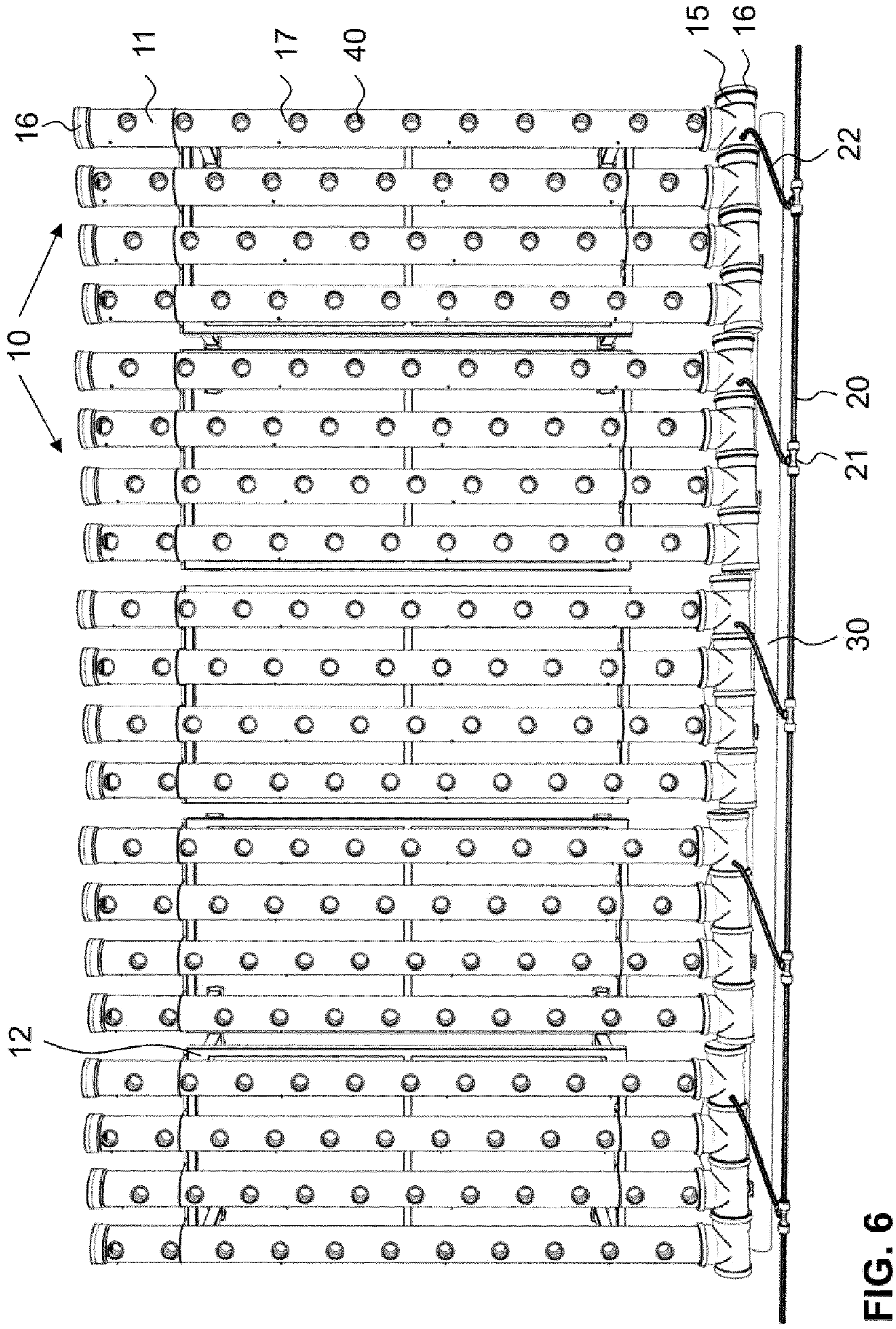
FIG. 6 shows a perspective view of five grow tube assemblies according to FIG. 1 as part of an embodiment of an aeroponic system.

FIG. 6 shows a perspective view of five grow tube assemblies 10 according to FIG. 1 as an aeroponic system. Each grow tube 11 comprises eleven positions for pots 40. The first and last holes 17 in a grow tube 11 are not positioned in the same distance from the free end closed by the cover 16 or the connection pipe 15. This difference in the distance is chosen in order to position an adjacent grow tube 11 in the opposite orientation so that the through-holes 17 are intercalated in a grow assembly 10 for adjacent grow tubes 11. It is always only one connection pipe 15 of each assembly 10 receiving the attachment of the distribution pipe 22 and the drainage pipe 31. This reduces the number of necessary connections.

FIG. 6 shows that it is possible to improve the use of the place of the grow tubes, when the supporting frames 12 are pushed e.g. from right to left, wherein on the right side a new frame with new pots is positioned while a fully grown supporting frame 12 is pushed out of the row on the left side. This necessitates longer and flexible distribution pipes 22 and longer and flexible drainage pipes 31.

Figure 7:
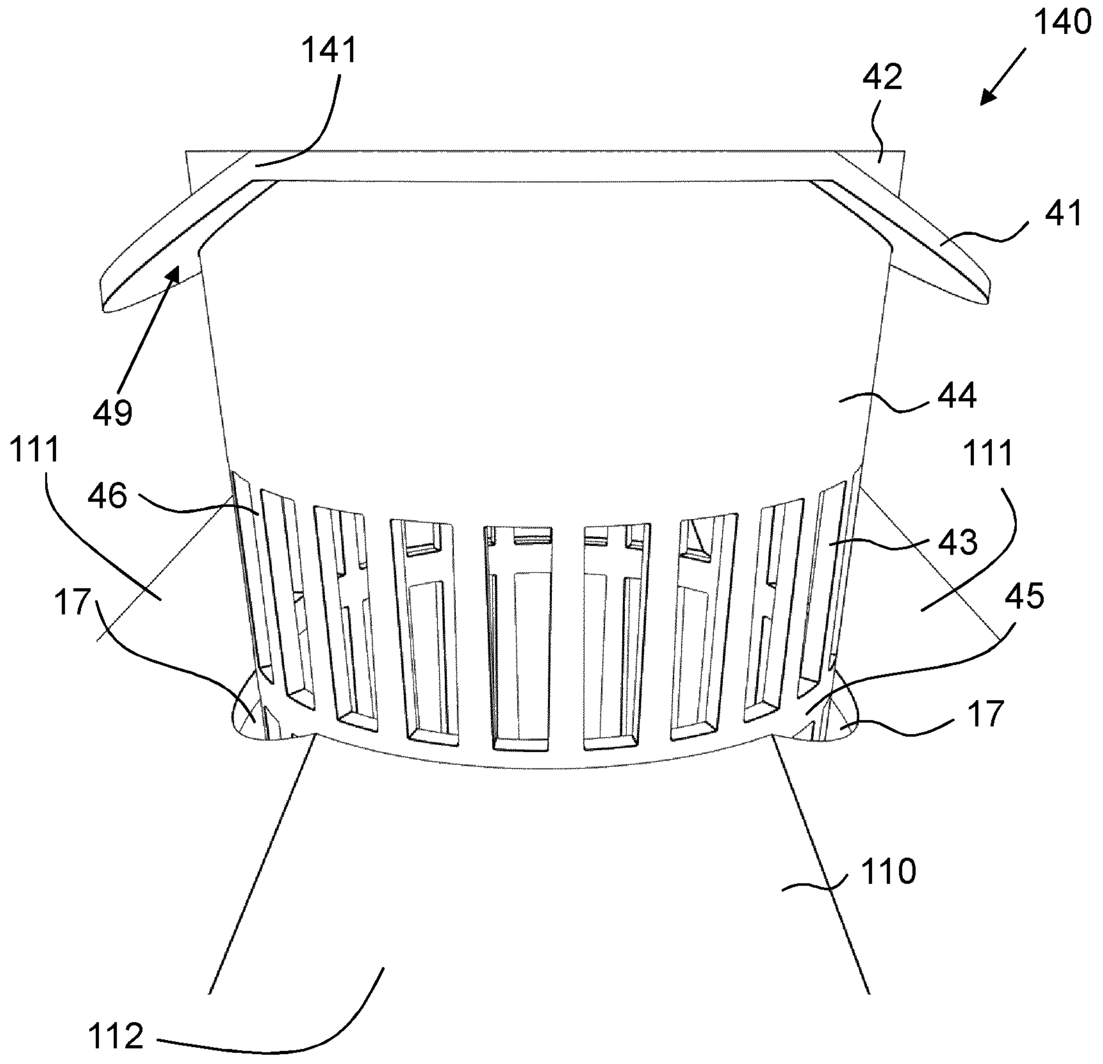
FIG. 7 shows a side view of a grow pot according to a further embodiment of the invention

FIG. 7 shows a side view of a grow pot 140 according to a further embodiment of the invention, partly introduced into a grow tube 110. The difference between the cylindrical or perhaps elliptical grow tube 11 and the grow tube 110 is the outer shape of the grow tube 110. The cross-section of the grow-tube 110 is a polygon, e.g. a hexagon or octagon. It is not necessary that the polygon is complete in the sense that it also forms the underside of the grow tube 110. It is possible that a "half-hexagon" with two inclined sides 111, 111 and a central horizontal surface 112 and a rounded underside like the grow tube 11 of FIGS. 1 to 6. The through-hole 17 is round for a round pot 140. It is also possible to cut out a square or rectangular through-hole 17 for other pots 140 with a square or rectangular section. The flange 141 has a central flat portion and two inclined side portions in FIG. 7 so that the underside 49 of the flange 141 is positioned on the inclined surfaces 111 of the grow tube 110 and the central surface of the flange 140 on the central horizontal grow tube 110 portion. The pot 40 is extending in an outside portion 42 wherein the height of the outside portion 42 going beyond the curved flange 41 is chosen to have a horizontal upper edge which can be flush in the central portion. The outside portion 42 can also be waived, so that the grow pot 40 ends with the flange 41 as upper surface.

Figure 8:
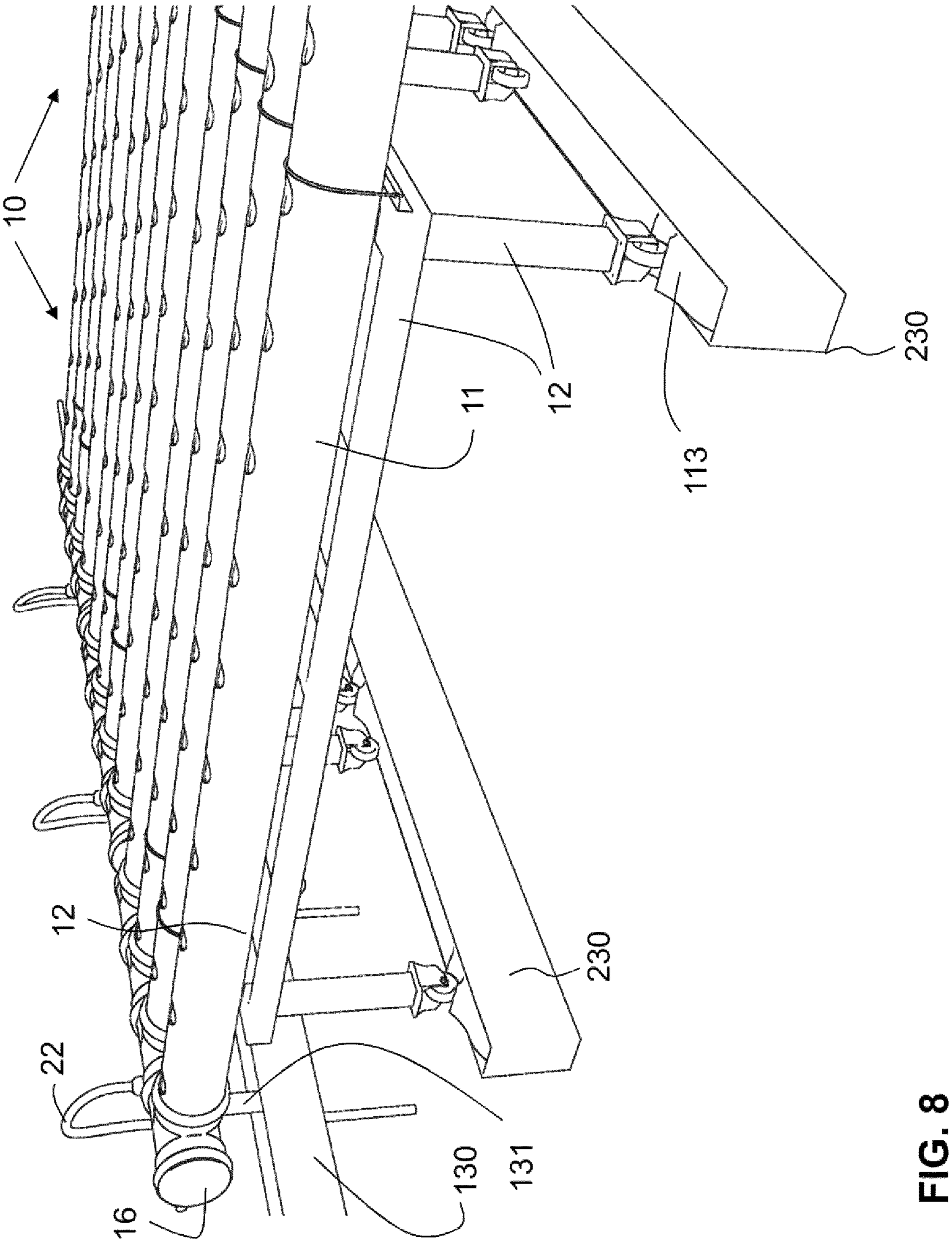
FIG. 8 shows a perspective view of several grow tube assemblies according to FIG. 1 as part of an embodiment of an aeroponic system.

FIG. 8 shows a perspective view of several grow tube assemblies 10 according to FIG. 1 as part of another embodiment of an aeroponic system. The grow tubes 11 are arranged in assemblies 10 on supporting frames 12 with legs. Preferably, the legs end with wheels 13 which are positioned on a conveyor basis 230. The conveyor basis 230 can be flush with the ground. Inside the conveyor basis 230 is a conveyor belt which comprises pusher dogs 113 in regular distances to advance adjacent frames 12 with its wheels 13. It is shown here as provided in a lengthy profile arranged orthogonally to the longitudinal axis of the grow tubes 11 or in other words in parallel to the movement of the assemblies explained in connection with FIG. 6. The conveyor basis 230 can also be a simple guide groove for the wheels 13 without any pusher dogs 113. Then the frames 12 are to be pushed from one side and the first pushed frame 12 then pushes the next frame 12 until the last frame 12 in row, which is usually withdrawn for harvesting.

In parallel to the conveyor basis 230 is provided a gutter 130, which is slightly inclined. The gutter 130 replaces the drainage manifold 30. The drainage pipe from the connection pipe 15 is here a drainage duct 131 which just hangs out of the connection pipe and can end above the gutter 130 ground surface.

Figure 9:
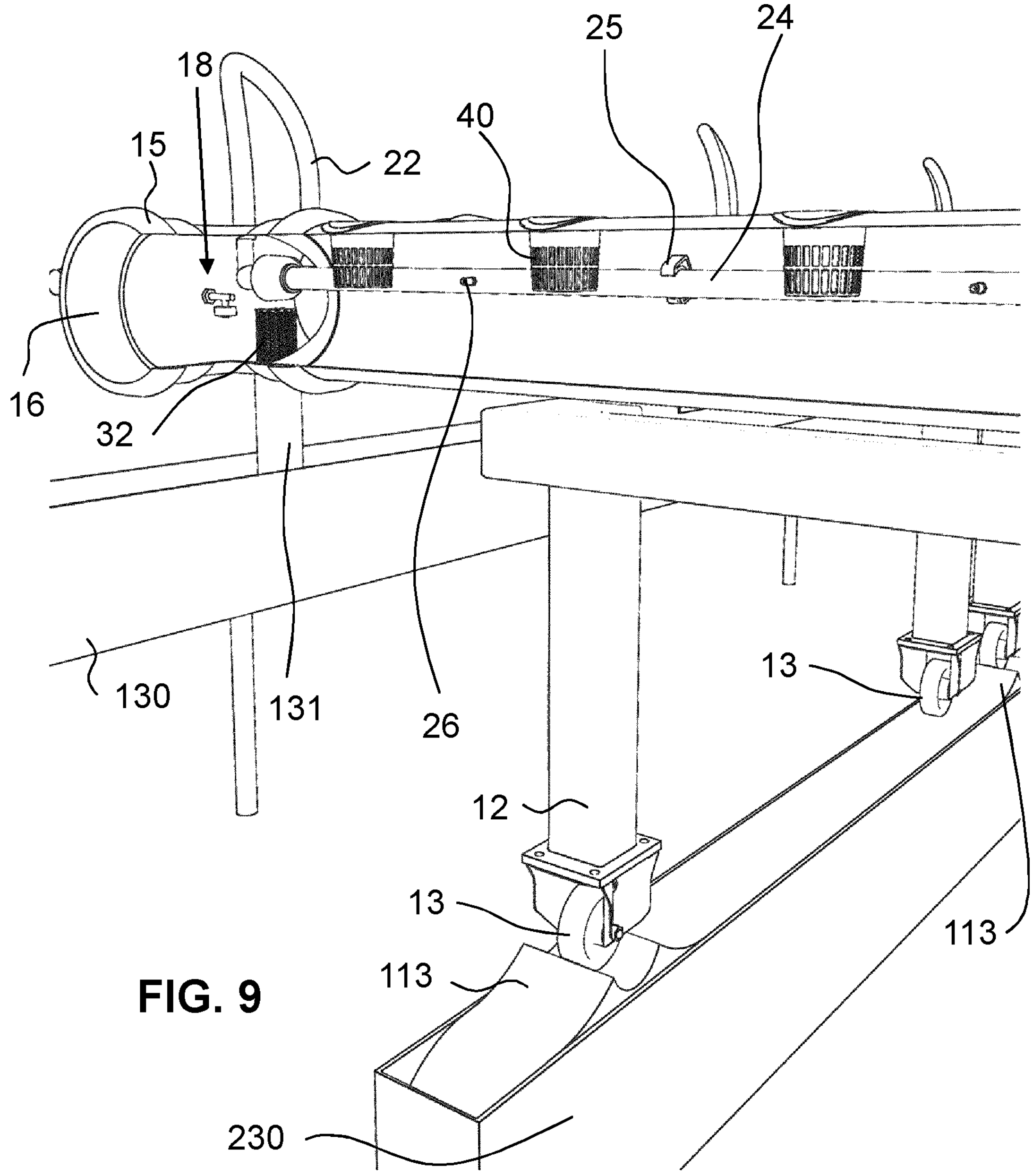
FIG. 9 shows a detail view of FIG. 8 similar to FIG. 2 in view of FIG. 1.

FIG. 9 shows a detail view of FIG. 8 similar to FIG. 2 in view of FIG. 1. It can be seen that two pusher dogs 113 are pushing the trailing wheel 13 while the front wheels 13 are just staying on the conveyor means. The advance can be continuous or intermittent, the drainage duct 131 of one assembly 10 always remain in the gutter 130.

Figure 10:
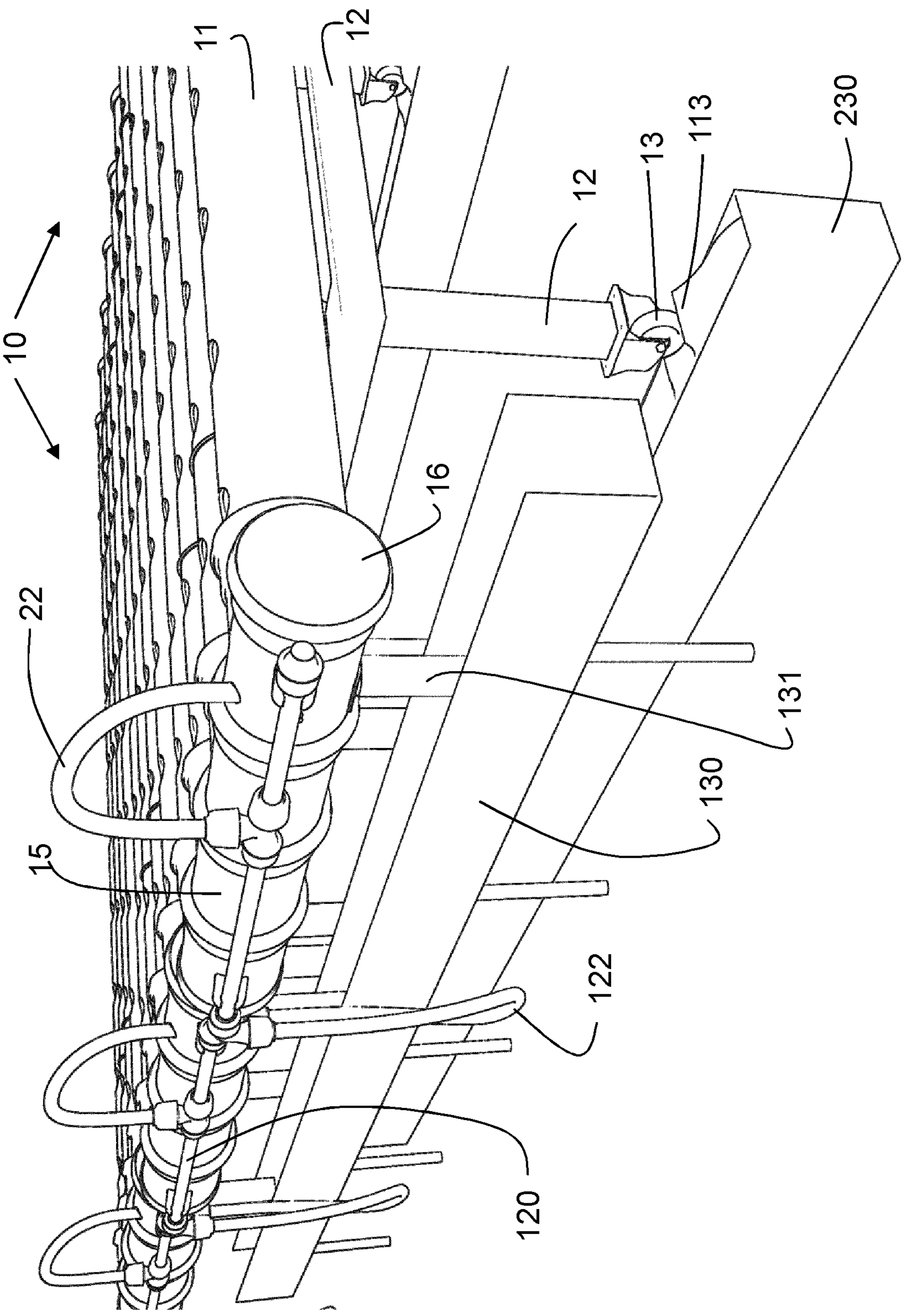
FIG. 10 shows a detail perspective view of FIG. 8 on the side of the connection pipes.
Figure 11:
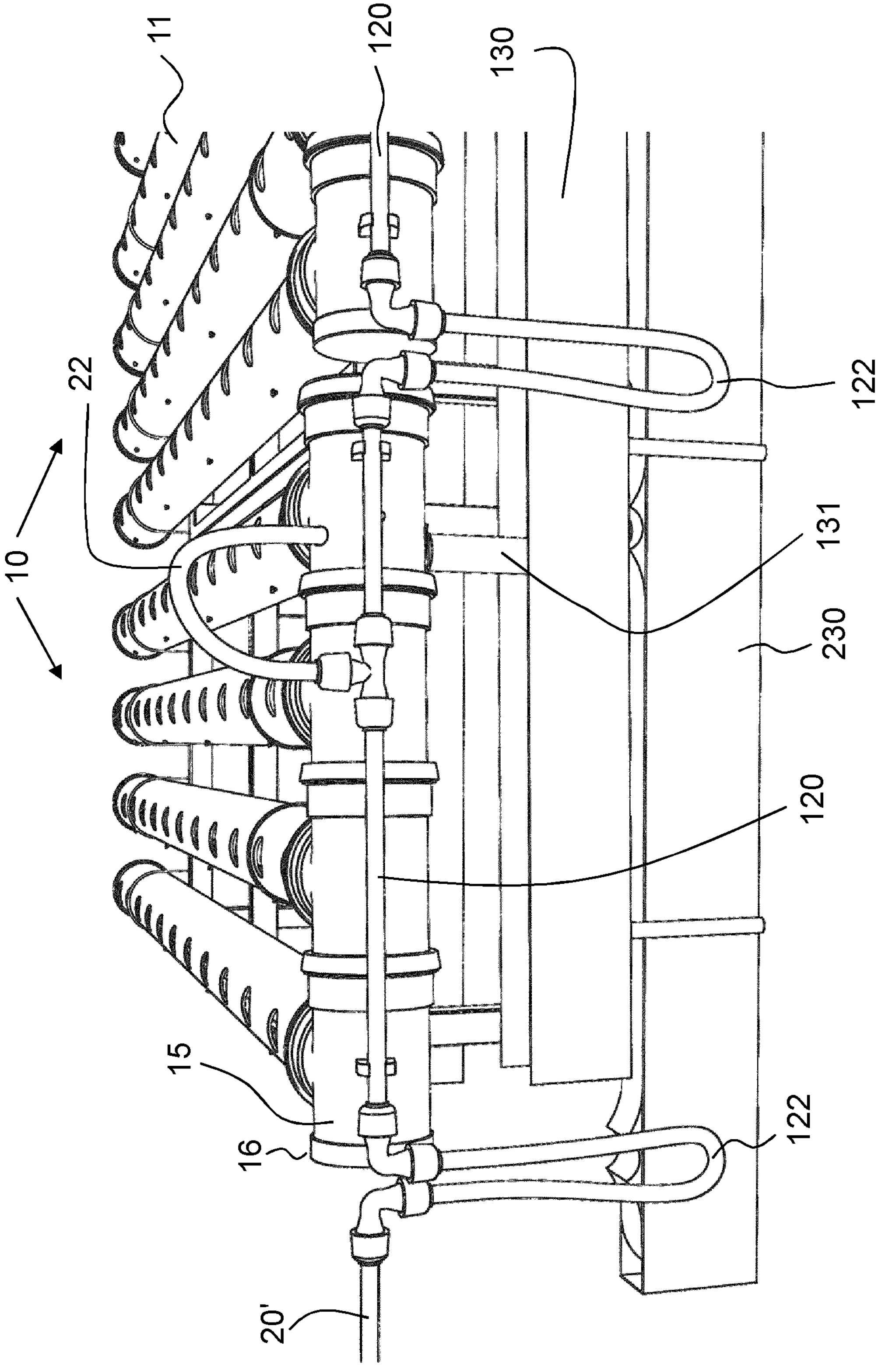
FIG. 11 shows a detail perspective view of FIG. 8 from behind on the side of the connection pipes.

FIG. 10 shows a detail perspective view of FIG. 8 from the side of the connection pipes and FIG. 11 shows a detail perspective view of FIG. 8 directly from behind on the side of the connection pipes. The main difference between the system of FIG. 1 with the system of FIG. 8 lies in the way the nutrient solution is provided. In FIG. 1 a central nutrient solution manifold 20 and separate distribution pipes 22 are provided. The same is true for the connection with drainage manifold 30. In the embodiment of FIG. 8 a common gutter 130 is provided and the drainage ducts 131 are just positioned above so that the move within the gutter when the assemblies are pushed by the pusher dogs 113 in the conveyor basis 230.

The central nutrient manifold 20' is connected to one or preferably to both ends of the group of assemblies via a flexible distribution connection pipe 122 to the nutrient solution manifold 120 which is fixedly connected to one assembly 10. The nutrient solution manifold 120 has just the length that on both sides the flexible distribution connection pipe 122 can be connected to the next adjacent nutrient solution manifold 120 or—at one or both ends—to a central nutrient manifold 20'. Providing nutrient solution from both sides reduces the pressure loss over the ducts. The further advantage is that, when an assembly is disconnected one side or a new assembly is connected on the entry side, only the end distribution connection pipe 122 are to be reconnected. The entire group of assemblies remain connected so that maintenance is even more reduced.

The flexible distribution connection pipe 122 also allows to separate adjacent frames 12 for a predetermined length without disconnecting the pipes 122 for maintenance reasons. This would necessitate the deactivation of pusher dogs (e.g. pivoting them sidewise out of the way of the wheels 13) or would be possible if the wheels 13 are just in grooves in the direction of the conveyor basis 230. Then the conveyor basis 230 comprises two simple grooves in parallel. It is also possible to separate the conveyor basis 230 into two subsequent stages, wherein in between a handling station is provided, where one aeroponic system is separated as last aeroponic system from the sequence of aeroponic systems of the first stage to be able to work in a free space around the frame 12 of the aeroponic system and said separated system is then later on reintegrated as new first aeroponic system of the sequence of aeroponic systems of the second stage. Separation here only means pushing the frame 12 away from the adjacent frame to be able to work from all sides on said system and reintegration means pushing the frame 12 towards and adjacent to the sequence of frames of the second stage. For this intermediate handling stage, it is convenient having said flexible distribution connection pipe 122 and access to the gutter to avoid disconnecting said frame. It is of course possible to provide a second handling station while e.g. separating the second stage into a second and a third stage with said second handling station positioned in between.

Figure 12:
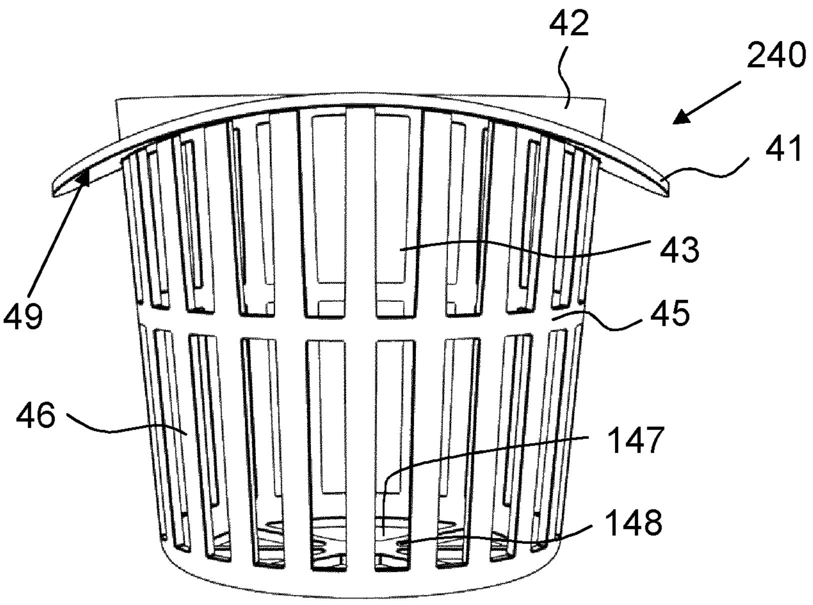
FIG. 12 shows a side view of a grow pot according to an embodiment of the invention.

FIG. 12 shows a side view of a grow pot 240 according to an embodiment of the invention. The flange 41 is at curved that the underside 49 of the flange is positioned on the surface of the grow tube 11 with a curvature complimentary to the cylindrical grow tube 11. The pot 240 is extending in an outside portion 42 wherein the height of the outside portion 42 going beyond the curved flange 41 is chosen to have a horizontal upper edge. The outside portion 42 can also be waived, so that the grow pot 40 ends with the flange 41 as upper surface.

The pot 240 has directly beneath the underside 49 of the flange cut-out portions with cut-outs 43. These cut-out portions comprise vertical webs 46 accompanying rectangular cut-outs 43 separated by horizontal webs 45. The difference between the present embodiment and the example of FIG. 3 is that here, there is no cylindrical closed part 44, since the webs 46 as well as the outside portion 42 are sufficient for the stability. On the other side these cut-outs 43 just beneath the underside 49 allow the distribution of the nutrient mist to a greater open surface.

Figure 13:
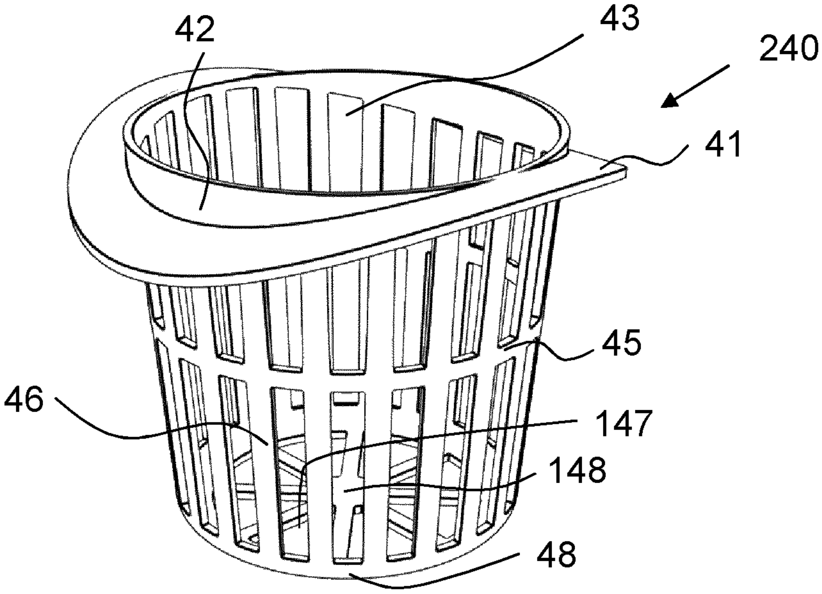
FIG. 13 shows a perspective view of a grow pot according to FIG. 12.
Figure 14:
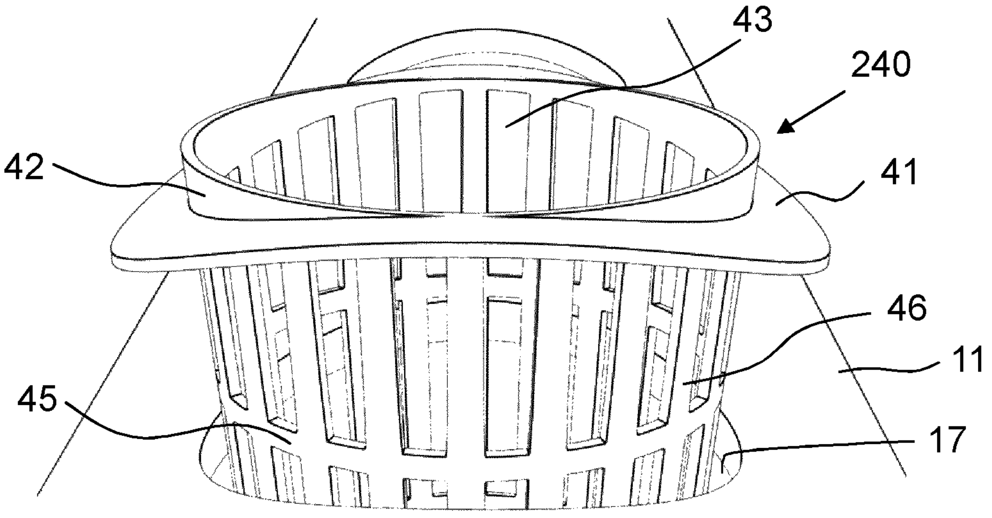
FIG. 14 shows a perspective view of the grow pot, partly introduced into a grow tube.

FIG. 13 shows a perspective view of a grow pot 240 according to FIG. 12 and FIG. 14 the same grow pot 240 partially inserted into a grow tube 11. The pot 340 has two rows of cut-outs 43 one above the other separated by horizontal webs 45 and a lower edge 48 surrounds the star-shaped bottom webs 148 which allows for openings 147 in this bottom area. It is also possible to omit the circumferential lower edge 48 so that the vertical webs 46 end in free ends.

Figure 15:
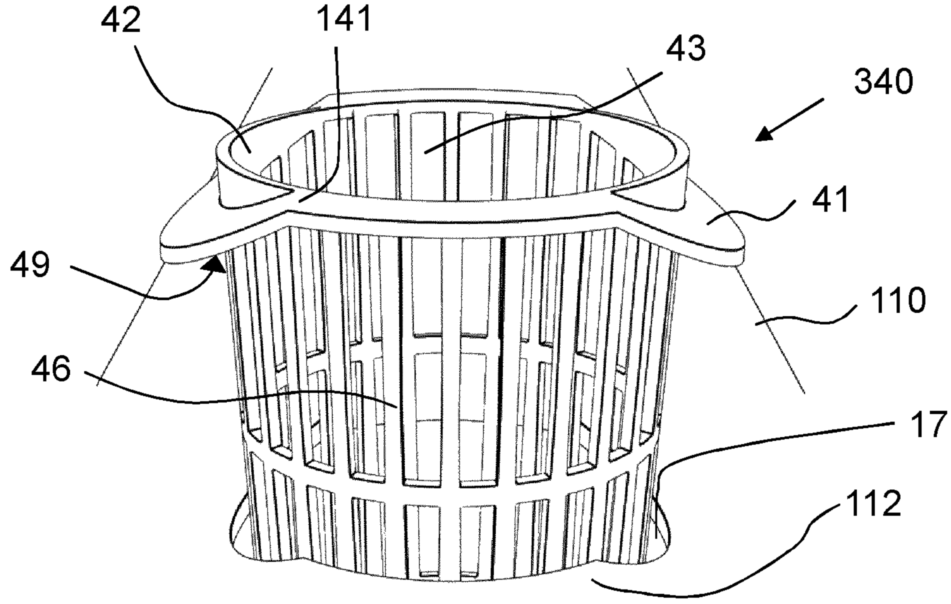
FIG. 15 shows a perspective view of a further embodiment of a grow pot.

FIG. 15 shows a side view of a grow pot 340 according to a further embodiment of the invention, partly introduced into a grow tube 110. The difference between the cylindrical or perhaps elliptical grow tube 11 and the grow tube 110 is the outer shape of the grow tube 110. The cross-section of the grow-tube 110 is a polygon, e.g. a hexagon or octagon. In this respect, the description of FIG. 7 applies here. The flange 141 has a central flat portion and two inclined side portions in FIG. 15 so that the underside 49 of the flange 141 is positioned on the inclined surfaces of the grow tube 110 and the central surface of the flange of the grow pot 340 on the central horizontal 112 grow tube 110 portion. The pot 340 is extending in an outside portion 42 wherein the height of the outside portion 42 going beyond the curved flange 41 is chosen to have a horizontal upper edge which can be flush in the central portion. The outside portion 42 can also be waived, so that the grow pot 40 ends with the flange 41 as upper surface. This embodiment has as the embodiment of FIGS. 12 to 14 a cut-out portion going just below the underside 49, so that the distributed mist can enter through cut-outs 43 into the plant in grow pot 340 at all places where this plant is inside the grow chamber. It is noted that preferably, in the embodiment of FIG. 12 and FIG. 15 there is small remaining edge of the vertical pot wall (reference numeral 44 for the pot 40 of FIG. 3) having a height of the thickness of the wall of the grow tube 10/110 which ensures that the cut-outs 43 end in the grow chamber and do not extend in the area of the wall passage.

Figure 16:
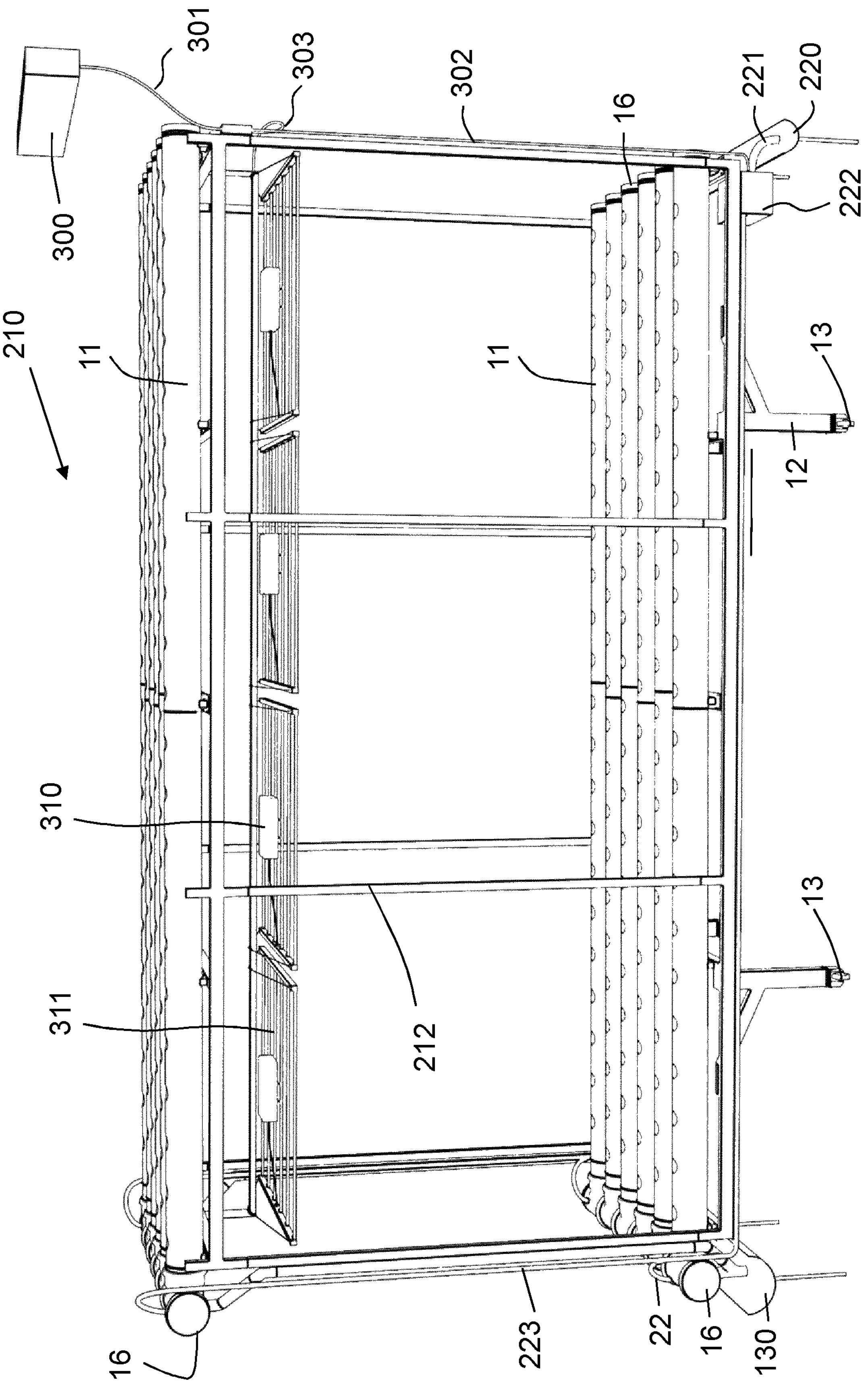
FIG. 16 shows a perspective view of a two-level grow tube assembly with grow tubes according to an embodiment of the invention.
Figure 17:
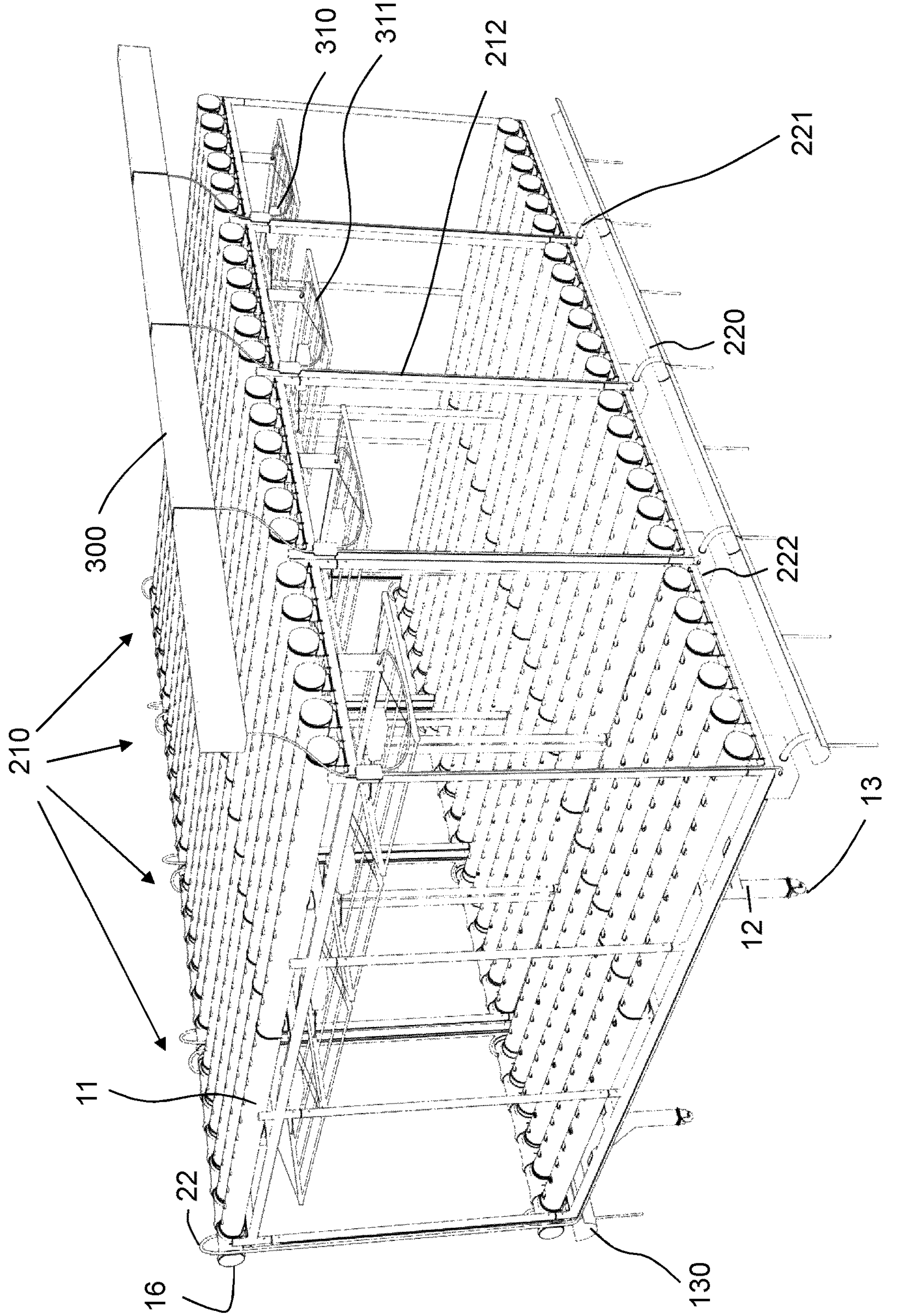
FIG. 17 shows a perspective view of several grow tube assemblies according to FIG. 16 as part of an embodiment of an aeroponic system with two levels.

FIG. 16 shows a perspective view of a two-level grow tube assembly 210 with grow tubes according to an embodiment of the invention. Each level of the grow tube assembly 210 is built as shown in FIG. 1. It is possible to have more than two levels. FIG. 17 shows a perspective view of several grow tube assemblies according to FIG. 16 as part of an embodiment of an aeroponic system with two levels. The grow tubes 11 can be built as explained in the above embodiments or according to the prior art.

The assembly 210 comprises a system which allows shifting of the assembly on wheels 13 and especially on a conveyor basis. This principle can be applied for both single and multi-level, automatic, manual and self-propelled shifting of a plurality of such assemblies 210.

Most features of the assembly 210 of FIG. 16 are identical or similar to the one-level assembly as shown in FIG. 1. Beside the difference of the number of levels, here two, the manifold system 20 and 30 from FIG. 1 are replaced by a different system. The gutter 30 for drainage was already described in connection with FIG. 8.

Here, a gutter system is also used for the nutrient solution manifold with gutter 220 which can be filled with nutrient solution continuously are intermittently. Every assembly 210 has at least one pipe 221 extending into the gutter 220 to a level that, if the gutter 220 is filled with nutrient solution, a pump 222 can pump the solution through pipe 221 and distributes is at above mentioned distribution pipes 22. For the second level after pumping it up through pipe 223 which is preferredly guided along a vertical post from the second level supporting frame 212. The difference is that the inflow is now not a hose under pressure (at least intermittently), but a (at least intermittently) standing body of water in a gutter 220 or channel, from which each assembly pumps its water with nutrients.

Furthermore, under the second level of grow tubes 11 are attached a number of lighting units or lamps 311 to provide lighting for the lower grow tubes. Another set of lighting units could be attached at an extended second level or third level frame to illuminate the plants in the pots in the second level, but this lighting can also be arranged by attaching such lights above the upper grow tubes without connection to the assembly 210.

Pump 222 and lighting 311 need electrical power. Therefore, these elements are connected via the pump electrical line 302 and the lighting electrical line 303 to the general electrical line 301 which is connected with a conductor rail 300.

With the conductor rail, the cable 301 has sliding contacts and is then pulled along in the conductor rail when the assembly is moved. This enables an automatic shifting of the assemblies 210 since no hoses or pipes have to be disconnected and reconnected. Only at the beginning and the end of the shifting space, the cable contacts have to be disengaged.

FIG. 17 shows four assemblies 210 side by side forming together with the common gutters 130 and 220 as well as the conductor rail 300 which is provided at a space near one longitudinal end of the frame on which the grow tubes are arranged; preferredly at a higher level so that no electric lines interfere with persons working on the ground. It is possible to have a conveyor system with a conveyor basis 230 and a pusher dogs for an automatic travel/shifting of the assemblies. A different shifting system uses a self-drive which also works with racks on rollers (i.e. without a conveyor belt) driven by a motor.

LIST OF REFERENCE SIGNS

10 grow tube assembly
11 grow tube
12 supporting frame
13 wheel
14 U-shaped fastener
15 connection pipe
16 cover
17 through-hole
18 monitoring swimmer
20 nutrient solution manifold
20' central nutrient solution manifold
21 T-junction
22 distribution pipe
23 distribution connector
24 internal distribution pipe
25 brace
26 distribution outlet
27 direction of mist distribution
30 drainage manifold
31 drainage pipe
32 filter
40 pot
41 curved flange
42 outside portion
43 cut-out
44 cylindrical closed part
45 horizontal web
46 vertical web
47 open bottom
48 lower edge
49 underside of flange
50 adapter
51 curved flange
52 outside portion
54 cylindrical part
55 upper supporting edge
56 recess
57 open through-hole
58 support surface
59 underside of flange
110 grow tube
111 inclined side surface
112 horizontal surface
113 pusher dog
120 nutrient solution manifold
122 distribution connection pipe
130 gutter (drainage)
131 drainage duct
140 grow pot
141 flange
147 slotted bottom
148 star-shaped bottom webs
210 grow tube assembly
212 second level frame
220 gutter (nutrient solution)
221 pipe
222 pump
223 second level connection pipe
230 conveyor basis
240 grow pot

300 conductor rail
301 electrical line (general)
302 electrical line (pump)
303 electrical line (light)
310 distributor
311 lamp assembly
340 grow pot

The invention claimed is:

1. An aeroponic assembly for growing plants having a plurality of aeroponic systems, each comprising:

a plurality of grow tubes, each having a grow chamber within an interior of the grow tube, a head portion at one longitudinal end of the grow chamber, an upper surface, an internal distribution pipe with nozzles in the grow chamber, and a plurality of openings in the upper surface, a plurality of grow pots adapted each to accommodate a plant and to be introduced in the openings to support a plant disposed with its roots suspended in air within the grow tube, a reservoir for a nutrient solution, a drainage manifold, a pressure manifold that fluidly couples the reservoir to the grow tube, and a frame having wheels or sliders;

wherein all grow tubes of the aeroponic assembly are positioned in parallel one to another in the longitudinal direction of the grow tubes on the frame;

wherein the grow tubes are connected at the head portion with a transverse connecting pipe which is connected to the pressure manifold;

wherein the pressure manifold is connected with the internal distribution pipe and wherein the pressure manifold is adapted for delivering the nutrient solution to the grow tube under pressure;

wherein the pressurized nutrient solution is misted into the grow chamber through the nozzles to be absorbed into the roots of each rooted plant supported in the grow tube; and wherein the drainage manifold is connected with the at least one grow tube adapted to collect unabsorbed nutrient solution from the grow tubes;

wherein the aeroponic assembly further comprises a conveyor basis on which the frames of the aeroponic systems are standing and are adapted to be advanced in a traverse direction either through pusher dogs or further comprising guiding grooves within which the wheels or sliders of the frames are standing;

wherein the reservoir for a nutrient solution is stationary in relation to the conveyor basis; and wherein the drainage manifold is stationary in relation to the conveyor basis; and wherein the drainage manifold of each aeroponic system comprises one drainage duct having a lower open outlet and the pressure manifold comprises at each aeroponic system one nutrient solution manifold with two opposite free connectors, wherein the aeroponic assembly comprises a gutter with sidewalls between which the lower open outlet of each of the plurality of drainage ducts are positioned and can move freely with respect to the gutter, and at one or at each opposite end of the group of aeroponic systems one central pressure manifold which is connected to one of the opposite free connectors of the nutrient solution manifold of the exterior aeroponic system(s), wherein the opposite free connectors of the nutrient solution manifold of all aeroponic systems are connected with adjacent free connectors of neighboring aeroponic systems via a flexible compression proof distribution connection pipe.

2. The aeroponic assembly according to claim 1, wherein each aeroponic system comprises a frame being a rack with a plurality of shelves, each shelf comprising a plurality of grow tubes connected to the same or a shelf-wise provided pressure manifold and connected to the drainage manifold.

3. The aeroponic assembly according to claim 1, wherein the gutter is inclined.

4. The aeroponic assembly according to claim 1, wherein a further pressure manifold is provided at the opposite free ends of the grow tubes where additional transverse connecting pipes are closing these opposite free ends of the grow tubes.

5. The aeroponic assembly according to claim 1, wherein a further pressure manifold is provided at the opposite free ends of the grow tubes where a further drainage manifold is provided in parallel to the further pressure manifold.

* * * * *